(12) United States Patent
Komura et al.

(10) Patent No.: US 8,011,688 B2
(45) Date of Patent: Sep. 6, 2011

(54) AIR BAG DOOR, METHOD OF CONTROLLING BREAKAGE OF FRACTURE LINES, AND METHOD OF DEPLOYING AIR BAG

(75) Inventors: Takahiro Komura, Kariya (JP); Junya Usami, Kariya (JP); Hideyuki Hayashi, Kariya (JP); Takahiro Muranushi, Kariya (JP); Kenji Katou, Kariya (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 97 days.

(21) Appl. No.: 12/309,779

(22) PCT Filed: Jul. 30, 2007

(86) PCT No.: PCT/JP2007/065317
§ 371 (c)(1),
(2), (4) Date: Jun. 10, 2009

(87) PCT Pub. No.: WO2008/016160
PCT Pub. Date: Feb. 7, 2008

(65) Prior Publication Data
US 2009/0278338 A1 Nov. 12, 2009

(30) Foreign Application Priority Data

| Jul. 31, 2006 | (JP) | 2006-208067 |
| Jul. 31, 2006 | (JP) | 2006-208705 |
| Dec. 4, 2006 | (JP) | 2006-326970 |
| May 28, 2007 | (JP) | 2007-140013 |

(51) Int. Cl.
*B60R 21/20* (2006.01)

(52) U.S. Cl. ................................................. 280/728.3
(58) Field of Classification Search ............... 280/728.3, 280/730.1
See application file for complete search history.

(56) References Cited

U.S. PATENT DOCUMENTS

| 5,060,971 A | 10/1991 | Nanbu et al. |
| 6,113,131 A | 9/2000 | Uehara et al. |
| 6,337,461 B1 | 1/2002 | Yasuda et al. |
| 7,165,782 B2 | 1/2007 | Yasuda et al. |
| 7,168,731 B2 | 1/2007 | Yasuda et al. |
| 7,938,437 B2 | 5/2011 | Lippert et al. |
| 2002/0060446 A1* | 5/2002 | Kassman et al. ........... 280/728.3 |
| 2004/0207181 A1 | 10/2004 | Hayashi et al. |
| 2005/0167956 A1* | 8/2005 | Yasuda et al. .............. 280/728.3 |
| 2007/0207233 A1* | 9/2007 | Bauer et al. ................... 425/141 |

FOREIGN PATENT DOCUMENTS

| AU | 731598 | 4/2001 |
| JP | 6-94266 | 11/1994 |
| JP | 7-21456 | 4/1995 |
| JP | 8-85407 | 4/1996 |

(Continued)

*Primary Examiner* — Faye M. Fleming
(74) *Attorney, Agent, or Firm* — Jordan and Hamburg LLP

(57) ABSTRACT

An air bag door in which the remaining thickness of a substrate at a centerline of a fracture groove formed into the shape of an air bag door on a back surface of the substrate is set to be smaller than other portions, and dotted fracture perforations for braking the superficial material are selectively provided at the centerline portion and near meeting points between sidelines and the centerline.

According to the invention described above, the substrate and the superficial material of the air bag door are broken in a desirable order of breakage by portions synchronously with each other when the air bag is expanded and deployed.

12 Claims, 6 Drawing Sheets

FOREIGN PATENT DOCUMENTS

| | | |
|---|---|---|
| JP | 9-188211 | 7/1997 |
| JP | 11-43003 | 2/1999 |
| JP | 11-115669 | 4/1999 |
| JP | 11-334490 | 12/1999 |
| JP | 2001-502996 | 3/2001 |
| JP | 2003-146172 | 5/2003 |
| JP | 2003-191815 | 7/2003 |
| JP | 2003-212075 | 7/2003 |
| JP | 2004-331046 | 11/2004 |
| JP | 2005-186712 | 7/2005 |
| JP | 2005-219572 | 8/2005 |
| JP | 2005-231514 | 9/2005 |
| JP | 2005-324705 | 11/2005 |
| WO | WO-2007/057054 | 5/2007 |

* cited by examiner

AIR BAG DOOR, METHOD OF CONTROLLING BREAKAGE OF FRACTURE LINES, AND METHOD OF DEPLOYING AIR BAG

BACKGROUND OF THE INVENTION

The present invention relates to an air bag door formed in interior materials of various vehicles having a superficial material on a substrate so as to be invisible, a method of controlling breakage of fracture lines of the air bag door, and a method of deploying an air bag when the air bag door is broken.

More specifically, the present invention firstly relates to an air bag door having a fracture inducing device for breaking the substrate and a fracture inducing device for breaking the superficial material so as to break the substrate and the superficial material in a preferred order of breakage by portions synchronously with each other when the air bag is inflated and deployed. The present invention secondly relates to a method of controlling breakage of fracture lines for causing the fracture lines of the air bag door to be broken in a desired preferable pattern when the air bag is deployed. The present invention thirdly relates to a method of deploying an air bag for guiding an air bag which is expanded when a vehicle such as a motor vehicle receives an impact to deploy in an optimal direction by a simple device.

BACKGROUND ART

Air Bag Door and Method of Controlling Breakage of Fracture Lines

For example, an air bag apparatus to be provided for a passenger seat in a motor vehicle is generally disposed on the back side of an instrument panel as a vehicle interior material. Generally in this case, a continuous fracture groove formed into a door-shape is formed on the back surface of a panel substrate at a portion corresponding to the instrument panel as a primary fracture inducing device. The fracture groove is formed into the shape of an air bag double door having a pair of doors in many cases. A secondary fracture inducing device is further provided on a bottom portion of the fracture groove. With these fracture inducing devices, the air bag door is configured to be broken and opened quickly on the basis of the expansion pressure generated when the air bag is deployed.

Generally, a variety of vehicle interior materials such as the instrument panel has a laminated structure having a superficial material on the substrate normally via a foam material layer. As the fracture inducing device of the laminated structure, a fracture inducing device which is able to break the substrate and the superficial material is necessary except for the foam material layer having an extremely low breakage resistance. Formation of the fracture groove belongs to the fracture inducing device for breaking the substrate. The fracture inducing device is formed from the substrate side, which corresponds to the back side of the vehicle interior material, considering so-called the invisibility.

[Patent Document 1] JP-A-2003-191815

An air bag door disclosed in Patent Document 1 shown above includes a fracture line provided on an instrument panel having at least a core material and a surface material. The fracture line includes holes having two types of depth, deep and shallow, formed discontinuously into a state of broken line from the back side of the instrument panel. There is not disclosure relating to the formation of the fracture groove. The deep holes described above penetrate through the core material and reach the surface material, and the shallow holes do not reach the surface material.

[Patent Document 2] JP-A-2003-212075

The structure of fracture line of an air bag door disclosed in Patent Document 2 shown above is provided on a laminated instrument panel including a substrate, a foamed resin layer and a superficial material. A portion for deployment provided on the substrate into the form of the fracture groove includes a removed portion 11 formed into an elongated hole which penetrates through the substrate and reaches a midsection of the foamed resin layer, and dotted holes 6 which penetrate through the substrate and the foamed resin layer and reach the superficial material. The dotted holes 6 are formed discontinuously in the form of a broken line.

[Patent Document 3] JP-A-6-94266

In an air bag storage cover disclosed in Patent Document 3 shown above, a continuous groove portion including a center fracture line and a pair of end fracture lines is formed. The groove portion includes deeply recessed portions at a distance from each other. In addition, the depth of the groove portion is increased at a portion near the central portion of the center fracture line.

[Patent Document 4] JP-A-2004-331046

In a lid member for an air bag apparatus disclosed in Patent Document 4 shown above, a recessed ridge is provided for forming the fracture line which is torn when the air bag is expanded. The recessed ridge includes recessed holes at a distance from each other. The recessed ridge at a portion of the fracture line where the fracture is to be started is formed to be deeper than other portions of the recessed ridge. A configuration of the fracture line when the lid member includes a superficial material is not disclosed.

According to the study of the present inventor, in the case of the fracture line for the air bag door formed on the vehicle interior material having the superficial material, the breakage pattern of the air bag door when the air bag is deployed changes significantly depending on the contents of the fracture inducing device at the respective portions of the fracture line. It is important that the substrate and the superficial material are broken in a preferred order of breakage by portions synchronously with each other when the air bag door is broken and opened.

When Patent Documents 1 to 4 are studied from such point of view, the following matters are pointed out. In other words, Patent Document 1 and Patent Document 2 disclose a technology in which the fracture inducing device for breaking the substrate and the fracture inducing device for breaking the superficial material are both provided in the instrument panel having the superficial material. However, there is no technical idea to control the order of breakage by portions of the substrate and the superficial material by these fracture inducing devices. In addition, there is no technical idea to synchronize the order of breakage of the substrate and the superficial material at all.

In Patent Document 3 and Patent Document 4, technologies in which the depth of the groove in the shape of the air bag door provided on the air bag storage cover or the like is adjusted by portions to control the order of breakage by portions are recognized. However, since the fracture inducing device with respect to the substrate having no superficial material is presupposed in these technologies, there is no disclosure on the fracture inducing device of the superficial material. As a matter of course, there is no disclosure of means for controlling the order of breakage by portions of the superficial material and, in addition, means for controlling the order of breakage by portions of the superficial material synchronously with the order of breakage by portions of the substrate at all.

As described later in conjunction with the present invention, the mode of the fracture inducing device and the distribution of the portion formed therewith over the entire fracture line are different between the control of the order of breakage of the substrate and the control of the order of breakage of the superficial material. Therefore, in assumption from the means for controlling the order of breakage by portions of the substrate disclosed in Patent Document 3 and Patent Document 4, it is difficult to conceive the means for controlling the order of breakage by portions of the superficial material. It is further difficult to conceive the means for controlling the order of breakage by portions of the superficial material synchronous with the order of breakage by portion of the substrate.

In this manner, on the basis of the disclosed invention in Patent Documents 1 to 4 shown above, it is difficult to realize an air bag door in which the substrate and the superficial material are broken synchronously in the preferred order of breakage by portions. When the substrate and the superficial material are not broken in the preferred pattern, the following inconveniences may be resulted.

(1) A quick and sufficient mode of deployment of the air bag on the basis of correct breakage and door-opening of the air bag door can hardly be ensured.

(2) The deployed air bag might be damaged because of formation of burr or the like at the broken portion as a result of the failure of clear breakage of the substrate.

(3) The breakage of a certain portion of the substrate might be impaired due to excessive constraint of the superficial material when the adequate breakage of the superficial material cannot be ensured.

(Method of Deploying Air Bag)

In an air bag apparatus to be provided in the vehicle such as the motor vehicle, an air bag is stored at an adequate portion of the vehicle interior material in a state of being covered with the air bag door. When the vehicle receives an impact, the air bag is expanded, and the air bag door is broken and opened by the pressure of expansion, so that the air bag is deployed into the vehicle chamber.

[Patent Document 5] JP-A-2005-324705

In the invention according to Patent Document 5 shown above, a cover member of the air bag apparatus includes a substantially H-shaped fracture line, and an extended fracture line having a certain configuration extended from the fracture line. The extended fracture line is configured in such a manner that both end portions of a portion designed to be a pair of doors are deformed so as to warp in the opposite directions when the air bag apparatus is operated. As a result, it provides an effect to constrain an impact or a pressure with respect to an occupant when the air bag is expanded in a state which the occupant of the vehicle is in the proximity of the air bag.

However, in the air bag apparatuses in the related art including the invention according to Patent Document 5, a specific device for guiding the direction of deployment of the air bag which is expanded at the time of impact cannot be recognized. In the air bag apparatuses in the related art, the air bag door is opened in a state of not being specifically constrained except for the hinged operation. Therefore, the expanded air bag is deployed normally in the substantially vertical direction with respect to a wall surface of the air bag storage without being interfered with the air bag door.

When the location of the wall portion where the air bag apparatus is installed, and the inclination of the wall surface thereof are in a desirable spatial positional relationship with respect to the occupant of the vehicle, the air bag is deployed in the direction optimal for protecting the occupant, and hence no problem is resulted.

However, when the air bag apparatus is provided, for example, in the instrument panel, there is a limitation in layout with respect to other various mounted components. The instrument panel itself has a certain surface shape. In view of these points, the air bag apparatus is obliged to be installed on an upper side portion of the instrument panel or on a portion in the vicinity thereof in many cases. In such a case, the air bag is deployed basically upward. This is not necessarily an optimal direction of deployment for protecting the occupant.

In the air bag disclosed in Patent Document 2, a pair of door members are provided in line symmetry. Therefore, it is considered that the pair of door members are opened in line symmetry and the air bag is deployed straight ahead from the midsection of the both door members when the air bag is expanded. Although the air bag apparatus disclosed in Patent Document 5 is provided with a characteristic extended fracture line, the effect is only to restrain the partial deployment as regards the expansion of the air bag, and the effect to guide the direction of deployment of the air bag is not recognized.

A possibility to adjust the direction of deployment of the air bag as a result by devising the shape of the bag of the air bag when being deployed is also conceivable. However, in this case, the air bag has an irregular shape, and it is difficult to change and control the direction of deployment of the air bag significantly.

The circumstances described thus far are not limited to the air bag apparatus to be installed in the instrument panel of the motor vehicle. For example, it is imagined that there are a number of cases to guide the direction of deployment of the air bag to an optimal direction also when the air bag apparatus is provided in a ceiling or a rear surface portion of a front seat of a vehicle such as the motor vehicle, a rear deck portion of a motor vehicle.

SUMMARY OF THE INVENTION

An object of the present invention is to provide an air bag door which is formed invisibly on a vehicle interior material provided with a superficial material on a substrate and the substrate and the superficial material are broken preferably in the preferred order of breakage by portions synchronously with each other when the air bag is inflated and deployed, and a method of controlling breakage of a fracture line embodied in such the air bag door.

Another object of the present invention is to provide a simple method of guiding an air bag which is expanded when a vehicle such as a motor vehicle receives an impact so as to be deployed in an optimal direction.

(First Invention)

The first invention of this application is an air bag door including a fracture groove continued in the shape of an air bag door having a pair of doors formed on a back surface of a substrate of a vehicle interior material with a superficial material and dotted fracture perforations formed at a distance from each other so as to penetrate through the substrate and reach the superficial material from the bottom portion of the fracture groove, in which the remaining thickness of the substrate of a groove portion of a centerline of the air bag door is set to be smaller than other portions by adjusting the depth of the groove for the fracture groove, and the dotted fracture perforations are selectively formed at the groove portion of the centerline and the groove portions near meeting points where a pair of sidelines of the air bag door meet the centerline.

According to the air bag door in the first invention, since the dotted fracture perforations for breaking the superficial material is formed from the bottom portion of the fracture groove for breaking the substrate formed continuously in the shape of the air bag door, breakage of the substrate and the superficial material is secured.

In the groove portion of the centerline of the air bag door, the depth of the fracture groove as a part of the fracture inducing device for breaking the substrate is increased, that is, the remaining thickness of the substrate of the corresponding portion is set to be smaller than other portions. In addition, the dotted fracture perforations for breaking the superficial material are formed selectively at the groove portion of the centerline. Therefore, a correct order of breakage such that the substrate and the superficial material start braking synchronously from the centerline portion of the air bag door is secured.

In contrast, the fact that the superficial material exerts an important influence on the breakage of the substrate at sideline portions of the air bag door is known experientially. When the superficial material does not break in the sideline portions at all, breakage of the sideline portions of the substrate is impaired by excessive constrain (tensile resistance) of the superficial material. In contrast, when the dotted fracture perforations are disposed entirely of the sidelines, since the superficial material is broken without any resistance along the sidelines, control of the superficial material with respect to the breakage of the substrate is no longer effective. It is turned out that the correct breakage of the air bag door is not secured in this case as well.

In the first invention, the dotted fracture perforations are selectively formed at the groove portions near the meeting point where the sidelines of the air bag door meet the centerline. In this case, when the breakage of the air bag door is converted from the centerline to the sideline, the sideline portions on the superficial material are broken at the meeting points as well. Therefore, there is no fear of impairment of the breakage of the substrate at the sideline portions by the excessive constraint of the superficial material and, simultaneously, the effect of control of the superficial material with respect to the substrate at the sideline portions is maintained.

As described above, in the air bag door according to the first invention, the substrate and the superficial material are desirably broken in a preferred order of breakage by portions synchronously with each other when the air bag is expanded and deployed. Consequently, the quick and reliable deployment mode of the air bag is secured, the breakage of the substrate on the sidelines on both sides is secured, and the substrate is clearly broken, so that the burr or the like which might interfere the deployed air bag is not formed.

(Second Invention)

According to the second invention of the present application, in the air bag door according to the first invention, elongated fracture perforations which penetrate through the substrate from the bottom portion of the fracture groove but do not reach the superficial material are formed at a distance from each other, and the dotted fracture perforations are formed in the bottom portions of the elongated fracture perforations and in the portion where the elongated fracture perforations are not formed at a distance from each other. The "elongated fracture perforations" mean a fracture inducing device cut into a narrow elongated shape or into a line. In contrast, the "dotted fracture perforations" mean a fracture inducing device cut into dots.

In the second invention as described above, breakage of the substrate is ensured further desirably by the elongated fracture perforations formed in the fracture groove. In order to desirably ensure the breakage of the substrate, the standard depth of the fracture groove may be increased relatively instead of formation of the elongated fracture perforations. According to the second invention, since the dotted fracture perforations are formed in the bottom portions of the elongated fracture perforations and a portion where the elongated fracture perforations are not formed at a distance from each other, the effect of breakage of the superficial material by the dotted fracture perforations is ensured as in the first invention.

(Third Invention)

According to the third invention of the present application, in the air bag door according to the first invention or the second invention, the remaining thickness of the substrate of the groove portion of the centerline is set to be specifically small at the central portion of the centerline, and the dotted fracture perforations are formed at a specifically high density in the groove portion at the central portion of the centerline and the groove portions near the meeting points.

In the third invention, the order of breakage by portions of the air bag door described above is ensured further reliably and smoothly. In other words, (1) the central portion of the centerline which is specifically breakable is broken first, then, (2) the entire centerline is broken linearly to both ends and then, (3) a pair of sidelines are broken subsequent to or simultaneously with (2) described above.

(Fourth Invention)

According to the fourth invention of the present application, in the air bag door according to the first invention to the third invention, the vehicle interior material is provided with a superficial material via a foam material layer on the substrate.

The vehicle interior material which forms the air bag door is not limited, but preferably includes the superficial material on the substrate via the foam material layer. In this case, the elongated fracture perforations may be formed so as to penetrate through the substrate and reach the foam material layer. Since the foam material layer is extremely easily breakable, the breakage of the substrate and the superficial material is not affected by the presence of the foam material layer.

(Fifth Invention)

According to the fifth invention of the present application, in the air bag door in any of the first invention to the fourth invention, a superficial material breaking fracture line including the dotted fracture perforations is extended from the both ends of the centerline outward beyond the meeting points.

The superficial material breaking fracture line is formed as an extension of the centerline of the fracture line for the air bag door, includes only the dotted fracture perforations, and includes neither the fracture groove nor the elongated fracture perforations.

As described above in conjunction with the first invention, it is important to ensure the desired breakage of the substrate at the sideline portions when breaking and opening the air bag door. If the substrate of the sideline portions is not broken as desired, the pair of doors of the air bag door might not be opened sufficiently, so that the sufficient deployment of the air bag may be impaired.

In the fifth invention, the superficial material breaking fracture line is extended outward from the both ends of the centerline in addition to the selective formation of the dotted fracture perforations at the portions near the meeting points as in the first invention. Therefore, the superficial material is further broken along the superficial material breaking fracture line. Consequently, the excessive constraint of the superficial material (excessive tensile resistance of the superficial material) with respect to the breakage of the substrate at the sideline portions may be restrained further desirably. Therefore, breakage of the sidelines is ensured further desirably. Only the breakage of the superficial material is occurred at the portion of the superficial material breaking fracture line, and the substrate is not broken.

(Sixth Invention)

According to the sixth invention of the present application, in the air bag door in the fifth invention, the superficial material breaking fracture line is extended outward from the both ends of the centerline with a bent to a preferred direction so that the direction of deployment is guided in the desired bent angle when the air bag is expanded.

When the superficial material breaking fracture line according to the sixth invention is provided, the following effects and advantages are obtained in addition to the effects and advantages in the fifth invention.

In other words, when the centerline portion and the sideline portions of the air bag door are broken and the pair of door members are about to open, only the superficial material is broken linearly in association with a bent at the portion of the superficial material breaking fracture line. When the superficial material is broken in such the shape, the one of the pair of door members located in the direction in which the superficial material breaking fracture line is bent (the former door member) is little subject to the tensile resistance of the superficial material, and is opened to a sufficiently large opening angle. In contrast, the other door member (the later door member) is subject to the tensile resistance of the superficial material, and is opened only to a small opening angle. As a result, the direction of deployment of the air bag is guided in the direction at a bent angle of the superficial material breaking fracture line by the control of the latter door member.

For example, when the air bag apparatus is installed in the instrument panel, the air bag door is obliged to be installed on the upper side portion or the like of the panel in view of the layout with respect to other various mounted components or the surface shape of the instrument panel itself in many cases. In such a case, the air bag is deployed basically upward, which is not necessarily the deployment in the optimal direction for protecting the occupant.

However, according to the sixth invention, the direction of deployment of the air bag when it is expanded may be guided in an optimal direction, which is obliquely upward from the instrument panel rearward (toward the passenger's seat). This is not limited to the case described above, and the direction of deployment of the air bag when it is deployed may generally be guided in the optimal direction for protecting the occupant.

(Seventh Invention)

The seventh invention of the present application is a method of controlling breakage of fracture lines for controlling the order of breakage by portions of a substrate and a superficial material to be broken synchronously with each other when the air bag is deployed including: forming a fracture line for an air bag door including a continuous fracture line of the shape of an air bag door having a pair of doors on a back surface of a substrate of a vehicle interior material with a superficial material and dotted fracture perforations formed at a distance from each other so as to penetrate through the substrate and reach the superficial material from the bottom portion of the fracture groove; adjusting the depth of the fracture groove of respective portions of the fracture line; and selectively forming the dotted fracture perforations at a specific portion of the fracture line.

According to the method of controlling breakage of fracture lines in the seventh invention, the order of breakage by portions of the substrate is controlled by adjusting the depth of the fracture groove. In contrast, the order of breakage by portions of the superficial material is controlled by selectively forming the dotted fracture perforations of the fracture lines with little effect to the breakage of the substrate. Therefore, by means of the adjustment of the depth of the fracture groove and the selective formation of the dotted fracture perforations in accordance with a preferred design of the shape of the fracture lines for the air bag door and desired mode of the fracture of the air bag door, the substrate and the superficial material are controlled to break in the order of breakage by portions synchronously with each other.

(Eighth Invention)

According to the eighth invention, in the seventh invention, adjusting the depth of the fracture groove is setting the remaining thickness of the substrate at the groove portion of the centerline of the air bag door to be smaller than other portions, and selectively forming the dotted fracture perforations is forming the dotted fracture perforations at the groove portion of the centerline and at groove portions near meeting points where the pair of sidelines meet the centerline of the air bag door.

In the method of controlling breakage of fracture lines in the eighth invention, a correct order of breakage such that the substrate and the superficial material start to be broken synchronously from the centerline portion of the air bag door is ensured. In addition, in doing so, there is no fear of impairment of the breakage of the substrate at the sideline portions by the excessive constraint of the superficial material as described above in conjunction with the first invention and, simultaneously, the effect of control of the superficial material with respect to the breakage of the substrate at the sideline portions is maintained.

(Ninth Invention)

According to the ninth invention, in the fracture lines according to the seventh invention or the eighth invention, elongated fracture perforations which penetrate through the substrate from the bottom portion of the fracture groove but do not reach the superficial material are formed at a distance from each other, and the dotted fracture perforations are formed in the bottom portions of the elongated fracture perforations and in the portion where the elongated fracture perforations are not formed at a distance from each other.

In the method of controlling breakage of fracture lines in the ninth invention, breakage of the substrate is secured further desirably by the elongated fracture perforation formed in the fracture groove. Also, since the dotted fracture perforations are formed in the bottom portions of the elongated fracture perforations and a portion where the elongated fracture perforations are not formed at a distance from each other, the effect of breakage of the superficial material by the dotted fracture perforations is ensured as in the eighth invention.

(Tenth Invention)

According to the tenth invention of the present application, a superficial material breaking fracture line including the dotted fracture perforations is extended outward from the both ends of the centerline according to any one of the seventh invention to the ninth invention beyond the meeting points linearly or at a bent angle.

In the method of controlling breakage of fracture lines in the tenth invention, as described above in conjunction with the fifth invention, excessive constraint of the superficial material with respect to the breakage of the substrate at the sideline portions is restrained further desirably. Consequently, breakage of the sidelines is ensured further desirably.

(Eleventh Invention)

According to the eleventh invention of the present application, the order of breakage by portions of the substrate and the superficial material according to the seventh invention to the tenth invention is the order from (1) to (3) shown below.

(1) The central portion of the centerline is broken first.

(2) The entire centerline is broken linearly to both ends. When the superficial material breaking fracture line is provided, the superficial material is simultaneously broken along the superficial material breaking fracture line.

(3) The substrate is broken along the pair of sidelines subsequent to or simultaneously with (2) described above.

In the method of controlling breakage of fracture lines according to the seventh invention to the tenth invention, the extremely desirable order of breakage by portions of the substrate and the superficial material as defined in the eleventh invention is ensured.

(Twelfth Invention)

The twelfth invention is a method of deploying an air bag includes: controlling an opening angle of an air bag door by door-opening-angle controlling means, and guiding the direction of deployment of the air bag using the opening angle of the air bag door when the air bag stored in a vehicle interior material with a superficial material is expanded upon reception of an impact and breaks and opens the air bag door for being deployed in a vehicle cabin.

In the twelfth invention, the direction of deployment of the air bag is guided by utilizing the opening angle of the air bag door controlled by the door-opening-angle controlling means. In other words, a novel and simple device for deploying the air bag expanded when the vehicle such as the motor vehicle receives an impact in an optimal direction is provided.

(Thirteenth Invention)

According to the thirteenth invention of the present application, the direction of deployment of the air bag is guided in a direction at a bent angle of the superficial material breaking fracture line by utilizing the tensile resistance of the superficial material at the time when the air bag door is broken and opened as the door-opening-angle controlling means by employing the air bag door according to the sixth invention as the air bag door according to the twelfth invention.

In the method of deploying an air bag in the thirteenth invention, the direction of deployment of the air bag is guided in the direction at a bent angle of the superficial material breaking fracture line from the reason described in conjunction with the sixth invention. Therefore, the direction of deployment of the air bag when it is deployed may be guided in the optimal direction for protecting the occupant.

DETAILED DESCRIPTION OF THE INVENTION

Figure 1:
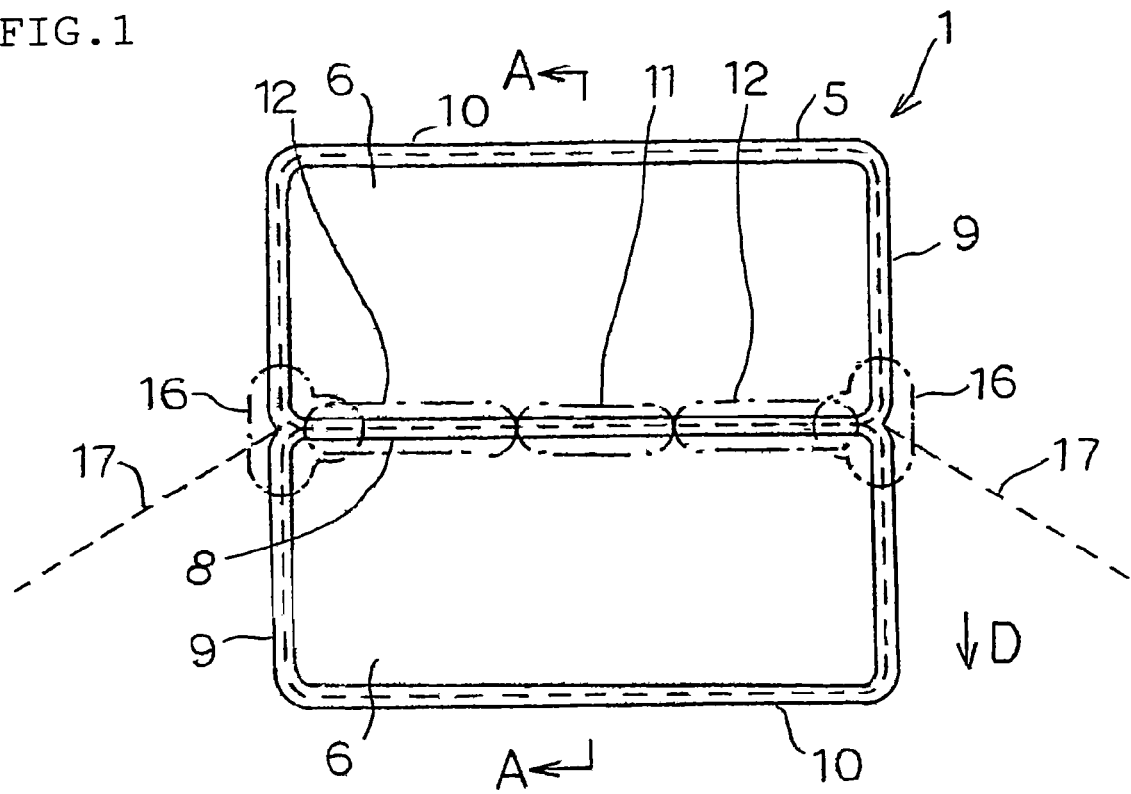
FIG. 1 is a drawing showing a general configuration of an air bag door according to Example 1 viewed from a back side of an instrument panel.

Embodiments of the present invention including a best mode will be described below.

[Air Bag Door]

An air bag door according to the present invention is formed in a vehicle interior material with a superficial material. Although the type of the vehicle interior material is not limited, the interior material for motor vehicles is preferably exemplified and, more specifically, instrument panels, ceiling materials, rear surface materials of front seats, rear deck materials, pillar garnishes, and the like are exemplified. As the vehicle interior material with the superficial material, in addition to the one formed with a superficial material directly on the substrate of the vehicle interior material, more preferably, the one formed with a superficial material on a substrate via an intermediate layer, for example, a foam material layer is exemplified. It is also possible to interpose an adhesive material layer between the substrate and the foam material layer.

The material of the substrate, the foam material layer, and the superficial material may be selected as needed. For example, suitable thermoplastic resin such as polypropylene may be used as a material of the substrate and foamed polypropylene or foamed polyurethane or the like may be used as a material of the foam material layer, and suitable types of polyolefin may be used as a material of the superficial material.

For example, the vehicle interior material having the superficial material formed on the substrate via the foam material layer is advantageously manufactured by a negative vacuum molding method having a process of vacuum-forming the superficial material having a foam material layer laminated on the back surface thereof, and simultaneously carrying out contact-bonding molding with the substrate. In this case, from the reason of the process steps, not only the fracture groove, but also the elongated fracture perforations and the dotted fracture perforations are formed from the side of the substrate (back side of the vehicle interior material) after having formed the laminated body. In order to carry out the formation of the fracture inducing device as such, various machining means known in the process of this type, for example, end milling or laser machining may optionally be employed. However, specifically, the end milling is preferably from the reason described later in this example.

The shape of the air bag door is defined by the continued fracture groove formed on the back surface of the substrate and, preferably, is a double air bag door having a pair of door members. A single air bag door having a single door member is also applicable. The door member may be connected with a known retainer for mounting the air bag via a hinge member on the back surface side.

[Fracture Groove]

On the back surface of the substrate of the vehicle interior material with the superficial material, the continued fracture groove in the shape of the air bag door is formed. From the bottom portion of the fracture groove, at least the dotted fracture perforations are provided at a distance with respect to each other toward the direction of the superficial material and, preferably, the elongated fracture perforations are additionally formed at a distance. Although the entire shape of the fracture groove is arbitrary corresponding to the shape of the formed air bag door, for example, in the double air bag door, the shape of "nichi (hi)" in Japanese Kanji or the shape of H of alphabet for the pair of door members is employed.

The remaining thicknesses of the substrate at the respective groove portions are defined by the depth of the fracture groove at the corresponding portions. The fracture groove is formed to have a certain standard depth as a whole. Although the standard depth may be determined optionally as needed and, for example, may be about a half the thickness of the substrate (half cut). However, the fracture groove is formed to be deeper in the groove portion of the centerline of the air bag door and, further preferably, is formed to be specifically deep at the groove portion of the central portion of the centerline. As an example, the remaining thickness B of the substrate may be set to be such as; the basic remaining thickness B at the groove portion is B=0.5 to 0.7 A, the remaining thickness B of the substrate at the groove portion of the centerline B is B=0.3 A to 0.5 A, and then the remaining thickness B at the groove portion of the central portion of the centerline is B=0.2 to 0.3 A, where A is the thickness of the substrate. The difference of the remaining thickness of the substrate as descried above determines the likelihood of occurrence of the breakage by portions at the groove portion of the substrate.

[Elongated Fracture Perforations]

The elongated fracture perforations are formed along the direction of formation of the fracture groove from the bottom portion of the fracture groove in a depth which penetrates through the substrate but does not reach the superficial material. The expression to "penetrate through the substrate but not reach the superficial material" means to "penetrate through the substrate but not perforate the superficial material" when the superficial material layer is formed on the substrate, and also when the superficial material is formed on the substrate via the foam material layer or the like. When the foam material layer or the like is interposed, the elongated fracture perforations are normally formed to a depth reaching the foam material layer or the like.

The position of formation and the frequency of formation of the elongated fracture perforations at the fracture groove are not specifically limited as long as it ensures breakage and opening of the substrate which constitutes the air bag door and it does not impair the advantages of the present invention. Preferably, the elongated fracture perforations arranged at a certain distance from each other and each having a certain longer diameter may be formed over the entire portion of the fracture groove. In this case, the ratio between the longer diameter of the elongated fracture perforations Pd and the length of a portion where the elongated fracture perforations are not formed in the fracture groove (the distance between the elongated fracture perforations) Pn is not limited, but may be, for example, Pd:Pn=4:6.

[Dotted Fracture Perforations]

The dotted fracture perforations are dotted cut holes formed to a depth which penetrates through the substrate and reaches the superficial material. When the foam material layer is interposed between the substrate and the superficial material, they penetrate through the foam material layer as well. However, they do not penetrate through the superficial material but reach the superficial material by a depth which does not make the traces of the formation thereof visible from the side of the vehicle cabin due to thermal distortion after the formation of fracture inducing device.

The dotted fracture perforations are selectively formed at the groove portion of the centerline and groove portions near meeting points where the pair of sidelines meet the centerline of the air bag door. More preferably, the dotted fracture perforations are formed at the groove portion of the central portion of the centerline and at the groove portions near the meeting points specifically at a high density. Here, the expression "the groove portions near the meeting points" means the centerline groove portion and the sideline groove portions near portions where the centerline and the sidelines meet in a T-shape. The dotted fracture perforations are generally formed so as to be arranged linearly. Since the density of formation, that is, the mutual distance of the arrangement are set as needed considering the hole diameter or the breaking strength of the superficial material, the relative density may be determined, but it is difficult to determine the absolute density uniformly. However, the distance of arrangement of the dotted fracture perforations is preferably secured by at least 1 mm at the portion where the density of formation is the highest.

The dotted fracture perforations may be formed in the bottom portion of the elongated fracture perforations, or may be formed in the portion of the fracture groove where the elongated fracture perforations are not formed. The advantages of formation of the fracture inducing device for breaking the superficial material do not change by the position of formation between these positions. The hole diameter of the dotted fracture perforations may be set as appropriate and, for example, the hole diameter of about 1 mm is preferable.

[Fracture Line for Breaking Superficial Material]

The superficial material breaking fracture line is a fracture line extended further outward from the meeting point from both ends of the centerline of the air bag door including double door members. In this fracture line, only the dotted fracture perforations are formed and neither the fracture groove nor elongated fracture perforations are formed.

The shape of extension of the superficial material breaking fracture line is not limited. Preferably, however, it is extended linearly from the centerline without being bent, and more preferably, is extended linearly with a bent to a preferred direction so that the direction of deployment is guided in the desired bent angle when the air bag is expanded. The term "linearly" must simply be substantially linear. Although the above-described bent angle may be determined optionally according to the requirement on the design data, it is preferably about 30°. The entire length of the superficial material breaking fracture line is not specifically limited and is determined optionally by the requirement of the design. However, it may be, for example, about 50 mm to 150 mm.

[Method of Controlling Breakage of Fracture Lines]

The method of controlling breakage of the fracture line according to the present invention relates to the control of breakage of the fracture line for the air bag door to be formed on the vehicle interior material with the superficial material. The object of the control is to cause the substrate and the superficial material to break in the order of breakage by portions synchronously when the air bag is deployed. The vehicle interior material with the superficial material includes the one formed with a superficial material directly on a substrate of a vehicle interior material and the one formed with a superficial material on a substrate via an intermediate layer such as a foam material layer.

The method of controlling breakage of the fracture line is carried out by a combination of first and second means described below and, further preferably, third means described below is also combined.

The first means is means of controlling the order of breakage by portions of the substrate, and is to adjust the depth of a continued air bag door-shaped fracture groove formed on the back surface of the substrate by every portion of the fracture line. As auxiliary means for the first means, the elongated fracture perforations as described above may be formed. The second means is means for controlling the order of breakage by portions of the superficial material, and is to selectively form the dotted fracture perforations, which are formed to penetrate through the substrate from the bottom portion of the fracture groove and reach the superficial material, in a specific portion of the fracture line.

In the first and second means described above, further preferably, the fracture groove is formed to be deeper at the groove portion of the centerline of the air bag door, and the dotted fracture perforations are selectively formed at the groove portion of the centerline and the groove portions near the meeting points. More preferably, the fracture groove is formed so as to be deeper specifically at the groove portion at the central portion of the centerline in the above-described groove portion of the centerline, and the dotted fracture perforations are formed specifically at a high density at the groove portion at the central portion of the centerline and the groove portions near the meeting points.

The third means is means for controlling the order of breakage by portions of the superficial material, and is to extend the superficial material breaking fracture line including the dotted fracture perforations outward from the both ends of the centerline beyond the meeting points linearly or at a bent angle.

The term "the order of breakage by portions synchronous with" means a methodical order of breakage by portion of the substrate and the superficial material which ensures quick and desirable deployment of the air bag. Therefore, it does not necessarily means that the substrate and the superficial material are broken simultaneously at the same order of breakage by portions, and it is not uniform depending on the shape of the fracture lines for the air bag door. In the case in which the air bag door includes a pair of double door members, as a preferable example of the order of breakage by portions of the substrate and the superficial material synchronously with each other, a breakage in the order of (1) to (3) shown below is exemplified.

(1) The central portion of the centerline is firstly broken. This breakage occurs substantially simultaneously in the substrate and the superficial material.

(2) The entire centerline is broken linearly to both ends. This breakage also occurs substantially simultaneously in the substrate and the superficial material. When the superficial material breaking fracture line is provided, the superficial material is broken substantially simultaneously with the breakage described above along the superficial material breaking fracture line.

(3) The substrate is broken along the pair of sidelines subsequent to or simultaneously with (2) described above.

[Method of Deploying Air Bag]

The method of deploying an air bag according to the present invention is a method including: controlling an opening angle of the air bag door by door-opening-angle controlling means when the air bag stored in the vehicle interior material with the superficial material is expanded upon reception of an impact, and guiding the direction of deployment of the air bag using the opening angle of the air bag door.

The type or the shape of the air bag door is not limited as long as it is, so called "a hinged door" and, for example, a single door and a double door are included. The specification of the door-opening-angle controlling means is not specifically limited, and the door-opening-angle controlling means on the basis of the optional configurations and operating mechanisms may be employed. For example, the system which uses the tensile resistance of the superficial material layer or a system using a stopper for stopping the opening operation of the air bag door at a certain opening angle are preferably exemplified.

The control of the opening angle of the air bag door is preferably 90° or smaller with respect to a wall surface where the air bag door is formed. Even when it is controlled to an opening angle exceeding 90°, a positive guiding function with respect in the direction of deployment of the air bag cannot be expected. More preferably, the opening angle of the air bag door is controlled within the range from 45° to 90°.

When the air bag door is the double door type including a pair of the door members, a case in which one of the door members guides the direction of deployment of the air bag and a case in which the direction of deployment of the air bag is guided using the opening angle of the both door members are contemplated. In the case in which the one of the door members guides the direction of deployment of the air bag, it is not specifically necessary to control the opening angle of the other door member. In the case in which the direction of deployment of the air bag is guided using the opening angle of the both door members, it is preferable to control the pair of door members to different opening angles by the door-opening-angle controlling means.

The specifically preferable method of deploying an air bag is a method of utilizing the tensile resistance of the superficial material generated when the air bag door is broken and opened as the door-opening-angle controlling means in the vehicle interior material with the superficial material. Further preferably, by utilizing the air bag door described in the sixth invention as the air bag door, it is a method of guiding the direction of deployment of the air bag in the direction at a bent angle of the superficial material breaking fracture line on the basis of the above-described operation in conjunction with the sixth invention.

EXAMPLES

Referring now to the drawings, examples of the present invention will be described. The technical scope of the present invention is not limited by the examples shown below.

Example 1

Air Bag Door in Example 1

An air bag door 1 in this example is formed in an instrument panel of a motor vehicle. The air bag door 1 viewed from the side of the back surface of the instrument panel is shown in FIG. 1, and a cross-sectional view taken along the line A-A of FIG. 1 is shown in FIG. 2.

Figure 2:
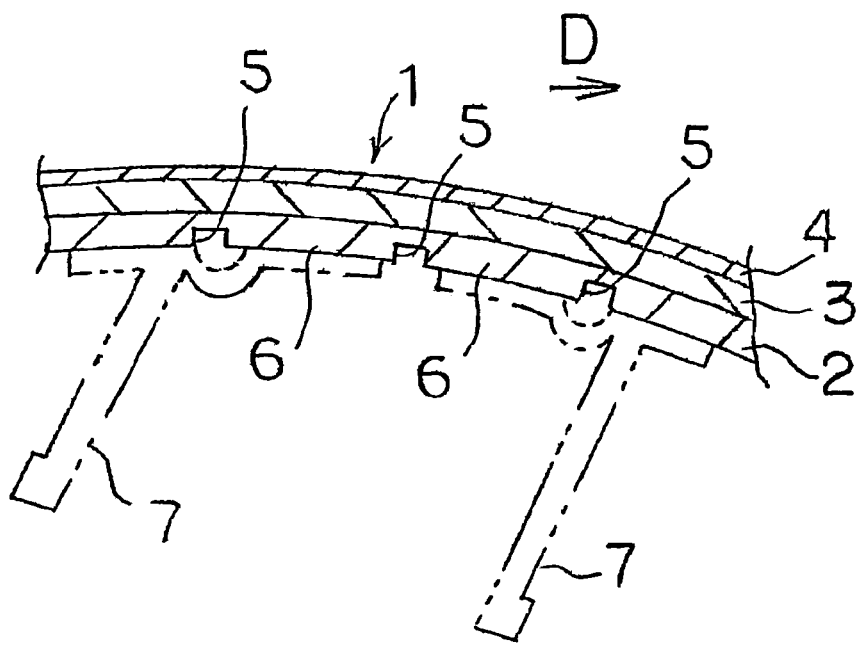
FIG. 2 is a cross-sectional view taken along the line A-A in FIG. 1.

As is understood from FIG. 2, the instrument panel is a laminated structure having a foam material layer 3 and a superficial material 4 on a substrate 2. The substrate 2 which constitutes the back surface of the instrument panel is formed of polypropylene having a thickness of 3 mm. The foam material layer 3 is a layer coming into contact with the substrate 2, and is formed of foamed polypropylene having a thickness of about 2 mm. The superficial material 4 which comes into contact with the foam material layer 3 constitutes the surface of the instrument panel, and is formed of polyolefin having a thickness of about 0.6 mm.

As shown in FIG. 1, by providing a fracture groove 5 continuously in the shape of the "nichi (hi)" in Japanese Kanji on the back surface of the substrate 2, the air bag door 1 including a pair of double door members 6 is formed. The width of the fracture groove 5 is 1 mm. As shown in FIG. 2, a retainer 7 for mounting the air bag is mounted on the back surface of the instrument panel at a position corresponding to the air bag door 1 by a vibration welding, and the retainer 7 and the pair of the door member 6 are connected respectively via the hinge members formed in retainer 7. Accordingly, the air bag door 1 is prevented from flying around when the air bag is deployed. In FIG. 1, illustration of the retainer 7 is omitted.

The fracture groove 5 includes a centerline 8 as a boundary line between the pair of the door members 6, sidelines 9 on both sides corresponding to the both ends of the door members 6, and upper and lower lateral lines 10 corresponding to the upper and lower ends of the air bag door 1 and extending in parallel to the centerline 8. In the fracture groove 5, the depth of the groove (remaining thickness of the substrate 2) is differentiated by portions.

Figure 3A:
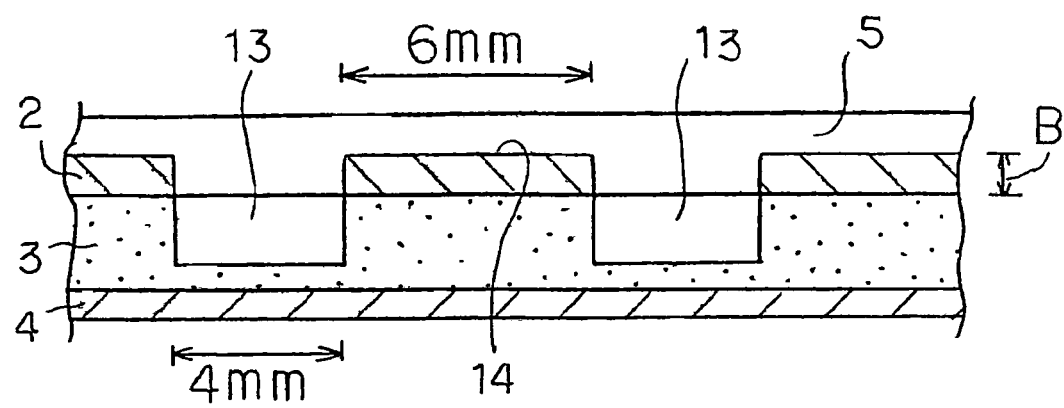
FIG. 3 is a drawing showing a configuration of a specific portion of a fracture groove according to Example 1.
Figure 3B:
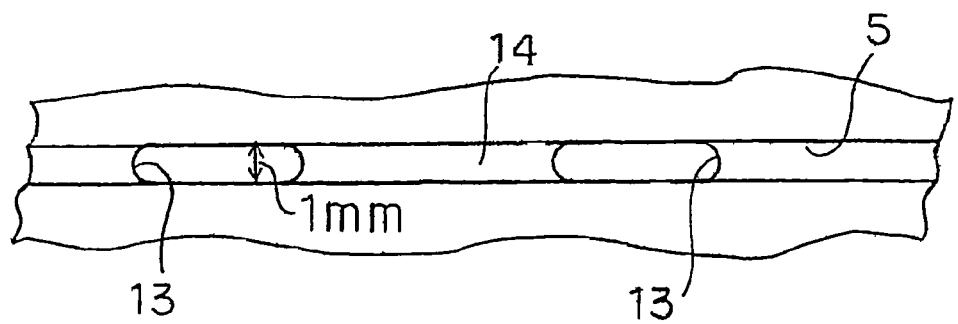

A remaining thickness B of the substrate 2 is 2.0 mm at portions of the sidelines 9 and the lateral lines 10 of the fracture groove 5. The remaining thickness B is shown in FIG. 3(*a*). FIG. 3(*a*) is a cross-sectional view along the fracture groove 5 at the portions of the lateral lines 10. FIG. 3(*b*) is a plan view of the fracture groove 5 at these portions.

The groove is formed relatively deeper at the portion of the centerline 8 of the fracture groove 5 to reduce the remaining thickness B of the substrate 2. In other words, in the portion of the centerline 8, the remaining thickness B of the substrate 2 is 1.3 mm at side portions 12 adjacent to both sides of a central portion 11, although not shown. The remaining thickness B of the substrate 2 at the central portion 11 of the centerline 8 is smaller and is 1.0 mm as shown in FIG. 4, which is the cross-sectional view along the direction of the fracture groove 5 in this portion.

As shown by a broken line marked along the fracture groove 5 in FIG. 1, elongated fracture perforations 13 which penetrate through the substrate 2 and reaches the foam material layer 3 are formed from the bottom portion at all the portions of the fracture groove 5 intermittently at a regular distance. The elongated fracture perforations 13 will be described on the basis of FIG. 3. The short diameter of the elongated fracture perforations 13 is 1 mm corresponding to the width of the fracture groove 5. The longitudinal diameter of the elongated fracture perforations 13 is uniformly 4 mm, and a portion in which they are not formed, that is, a distance 14 between the elongated fracture perforations 13 is uniformly 6 mm.

Subsequently, from the bottom portion of the fracture groove 5, dotted fracture perforations 15 which penetrate through the substrate 2 and the foam material layer 3 and reach the superficial material 4 are also provided depending on the portion. The diameter of the dotted fracture perforations 15 is 1 mm corresponding to the width of the fracture groove 5. The dotted fracture perforations 15 are selectively provided at the portion of the centerline 8 and at portions near the meeting points 16 where the sidelines 9 meet the centerline 8 in a T-shape, and they are provided specifically at a high density in the central portion 11 of the centerline 8 and the portions near the meeting points 16.

Figure 4A:
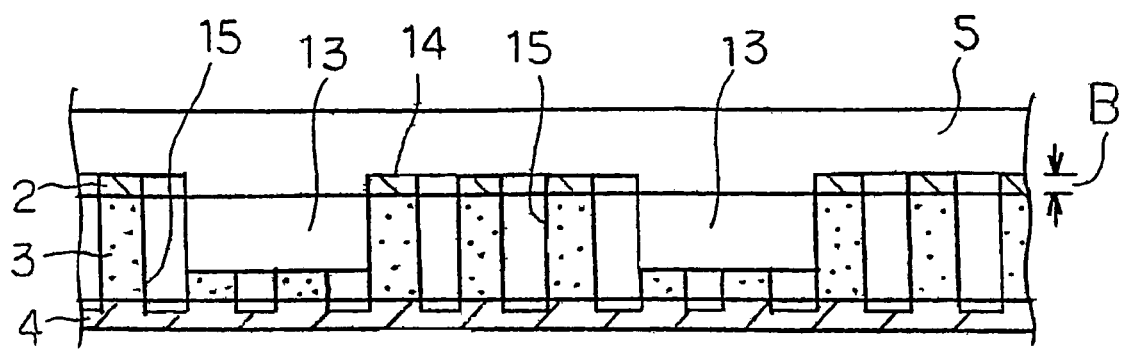
FIG. 4 is a drawing showing a configuration of the specific portion of the fracture groove according to Example 1.
Figure 4B:
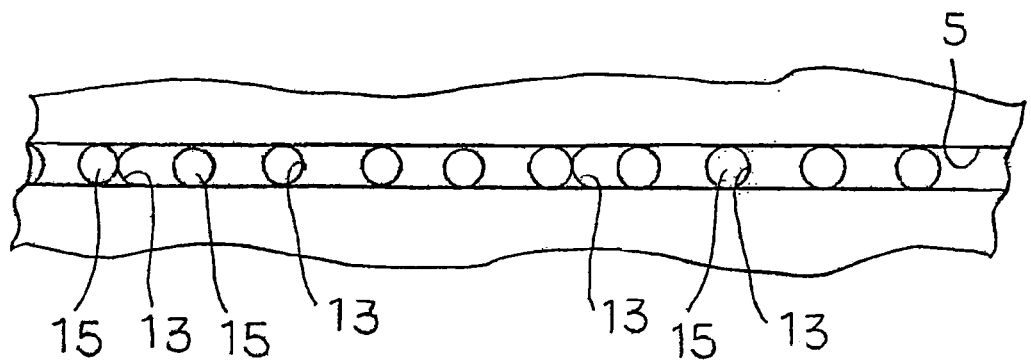

In FIG. 4, FIG. 4(*a*) is a cross-sectional view along the direction of the fracture groove 5 in the central portion 11 of the centerline 8, and FIG. 4(*b*) is a plan view of the fracture groove 5 in this portion. As shown in FIG. 4, the dotted fracture perforations 15 having a diameter of 1 mm are provided at a distance of 1 mm from each other in the central portion 11 of the centerline 8, and hence the dotted fracture perforations 15 are provided from the portion 14 where the elongated fracture perforations 13 are not formed and also from the bottom portion of the elongated fracture perforations 13 as a result. In the portions of the portions near the meeting points 16 as well, the dotted fracture perforations 15 are provided at the same level of density. In the side portions 12 of the centerline 8, the dotted fracture perforations 15 are provided at a slightly lower density than that described above.

The width of the fracture groove 5, the short diameter of the elongated fracture perforations 13, and the diameter of the dotted fracture perforations 15 described thus far are all equally 1 mm, so that they may be formed continuously in the same process step using the same end mill, for example.

Figure 5A:
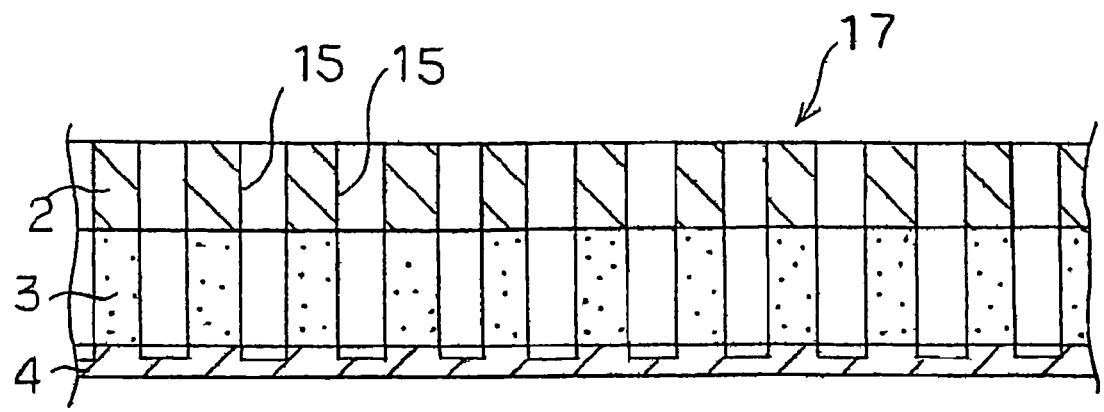
FIG. 5 is a drawing showing a configuration of a superficial material breaking fracture line according to Example 1.
Figure 5B:
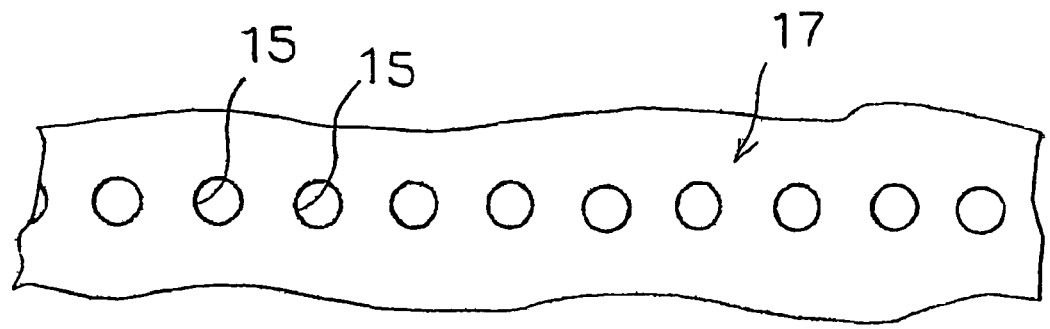

As shown in FIG. 1, the air bag door 1 is further provided with a superficial material breaking fracture line 17. The superficial material breaking fracture line 17 has a shape extending from the both ends of the centerline 8 outward beyond the meeting points with respect to the sidelines 9, and is bent at an angle of about 30° and extend linearly in the direction indicated by an arrow D. In FIG. 5, FIG. 5(*a*) is a cross-sectional view taken in the direction along the superficial material breaking fracture line 17, and FIG. 5(*b*) is a plan view of the same portion. As shown in FIG. 5, the superficial material breaking fracture line 17 is formed only by arrangement of the dotted fracture perforations 15, and is not associated with the fracture groove 5 or the elongated fracture perforations 13. The density of the provision of the dotted fracture perforations 15 is preferably relatively high, and it is the same density as the central portion 11 of the centerline 8 shown in FIG. 4 in this example.

(The Method of Controlling Breakage of Fracture Lines and the Method of Deploying an Air Bag in Example 1)

Since the air bag door 1 in this example is configured as described above, the method of controlling breakage of fracture lines and the method of deploying an air bag as described below are realized as the effects and advantages thereof.

That is, when the air bag is expanded and deployed, the breakage starts at the central portion 11 of the centerline 8 where the breaking strength of the substrate 2 and the superficial material 4 is the lowest. Then, the force of the breakage reaches the entire centerline 8 where the breaking strength is relatively low, so that the entire centerline 8 is broken at once.

Then, almost simultaneously, a breaking action toward the centerline 8 is smoothly converted to a breaking action for the sidelines 9 extending in the direction intersects at a substantially right angle therewith. In the sidelines 9, since the dotted fracture perforations 15 are not provided except for the portions near the meeting points 16, only the substrate 2 is mainly broken, which leads to the door-opening action of the pair of door members 6. However, excessive constraint (excessive tensile resistance) of the superficial material 4 with respect to the door-opening action of the door members 6 is avoided by the dotted fracture perforations 15 provided at a high density in the portions near the meeting points 16.

In this manner, in the air bag door in this example, the substrate 2 and the superficial material 4 are desirably broken in a preferred order of breakage by portions synchronously with each other when the air bag is expanded and deployed.

In addition, since the superficial material breaking fracture line 17 is extended linearly from the both ends of the centerline 8 at a bent angle of about 30°, the following effects and advantages are ensured as well.

Figure 6A:
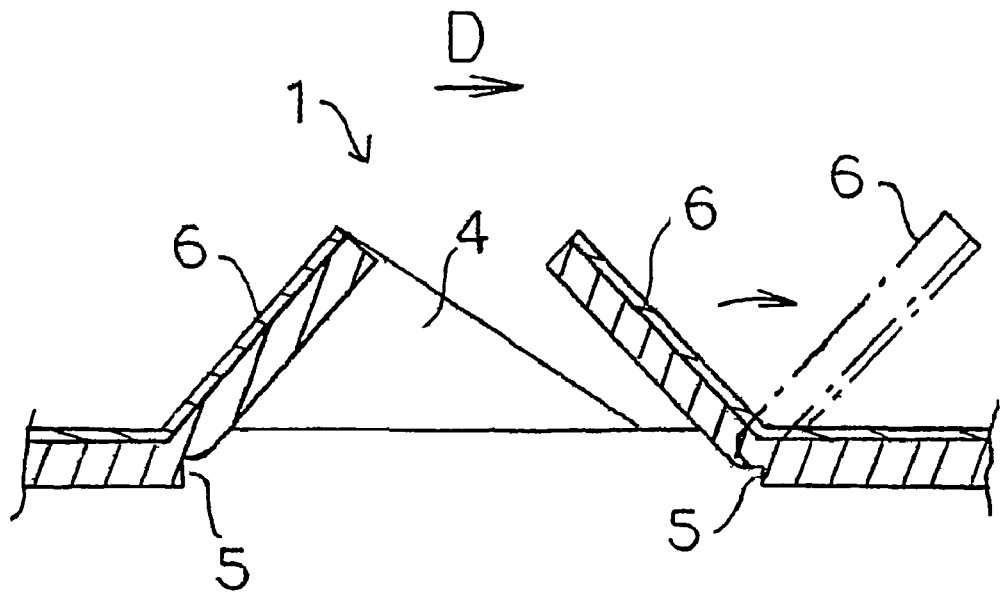
FIG. 6 is an explanatory drawing showing effects and advantages of Example 1.
Figure 6B:
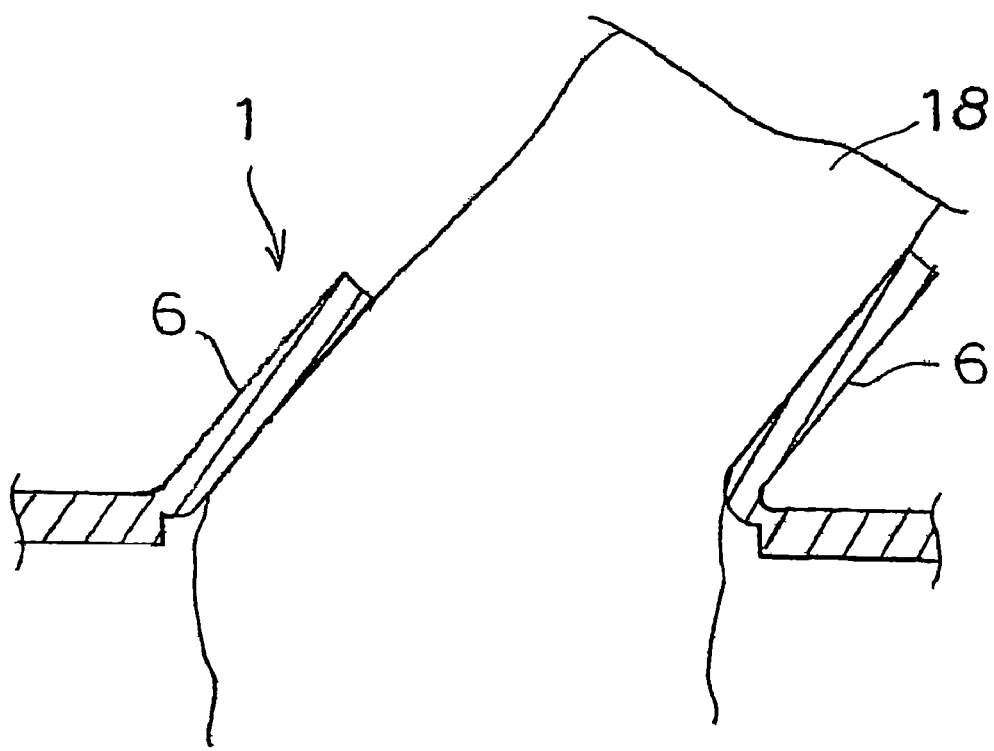

That is, when the pair of door members 6 of the air bag door 1 are about to open as shown in FIG. 6(*a*), in the portion of the superficial material breaking fracture line 17, only the superficial material 4 is broken linearly so as to bent in the direction indicated by the arrow D. Therefore, while the door member 6 (the door member on the right side in the drawing) positioned in the direction indicated by the arrow D is opened to a large extent while receiving little tensile resistance of the superficial material 4, the door member 6 on the left side in the drawing receives the tensile resistance of the superficial material 4 and hence can only be opened to a small opening angle. Consequently, as shown in FIG. 6(*b*), the direction of deployment of the air bag 18 is controlled by the door member 6 on the left side, and is guided in the direction at the bent angle of the superficial material breaking fracture line 17. Accordingly, the direction of deployment of an air bag 18 is guided in an optimal direction for protecting the occupant.

Example 2

Figure 7:
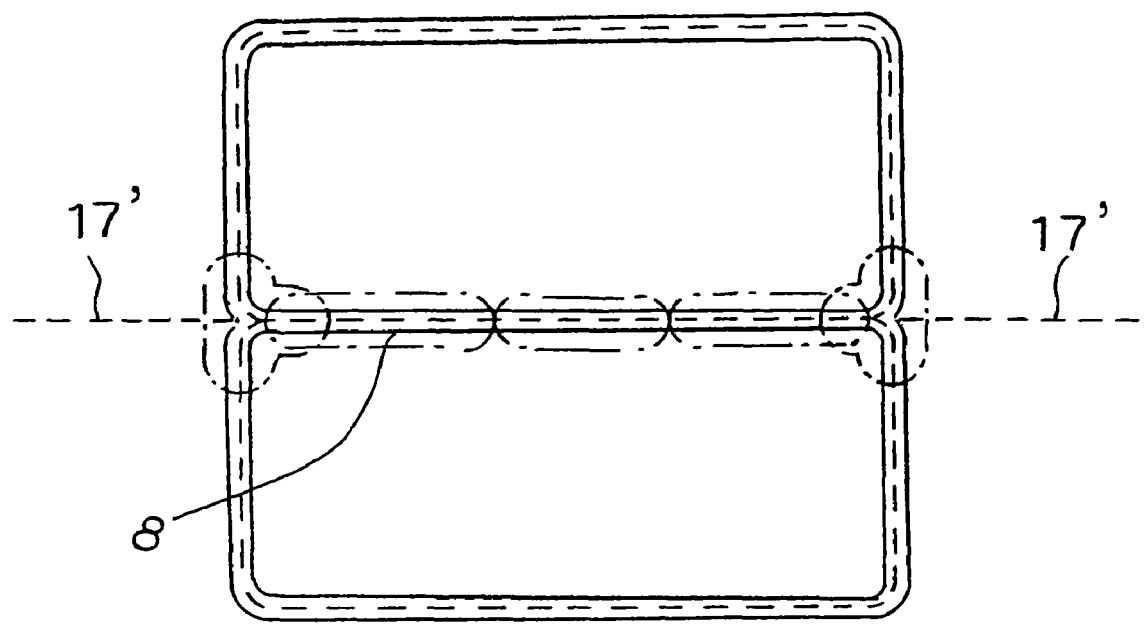
FIG. 7 is a drawing showing a general configuration of the air bag door according to Example 2 viewed from the back side of the instrument panel.

In this example, as shown in FIG. 7, the configuration is the same as Example 1 except for a point that a superficial material breaking fracture line 17' is extended linearly without being bent from the centerline 8. The effects and advantages in Example 2 are the same as in Example 1 other than that the effect and advantage shown in FIG. 6(a) and FIG. 6(b) described above are not achieved.

INDUSTRIAL APPLICABILITY

According to the present invention, the air bag door in which a substrate and a superficial material are broken in the preferable order of breakage by portions synchronously when an air bag is expanded and deployed, a method of controlling breakage of fracture lines for causing the fracture lines of the air bag door to be broken in a desirable pattern when the air bag is deployed, and a method of deploying an air bag for causing the air bag to be deployed in an optimal direction with a simple device are provided.

The invention claimed is:

1. An air bag door comprising a fracture groove continued in the shape of an air bag door having a pair of doors formed on a back surface of a substrate of a vehicle interior material with a superficial material and dotted fracture perforations formed at a distance from each other so as to penetrate through the substrate from the bottom portion of the fracture groove and reach the superficial material, wherein the remaining thickness of the substrate of a groove portion of a central portion of a centerline of the air bag door is set to be smaller than side portions of the centerline by adjusting the depth of the groove for the fracture groove, and the dotted fracture perforations are selectively formed at the groove portion of the centerline and the groove portions near meeting points where a pair of sidelines of the air bag door meet the centerline.

2. The air bag door according to claim 1, wherein elongated fracture perforations which penetrate through the substrate from the bottom portion of the fracture groove but do not reach the superficial material are formed at a distance from each other, and the dotted fracture perforations are formed in the bottom portions of the elongated fracture perforations and in the portion where the elongated fracture perforations are not formed at a distance from each other.

3. The air bag door according to claim 1, wherein the remaining thickness of the substrate of the groove portion of the centerline is set to be specifically small at the central portion of the centerline, and the dotted fracture perforations are formed in the groove portion at the central portion of the centerline and the groove portions near the meeting points at a specifically high density in comparison with the side portions of the centerline.

4. The air bag door according to claim 1, wherein the vehicle interior material is provided with a superficial material via a foam material layer on the substrate.

5. The air bag door according to claim 1, wherein a superficial material breaking fracture line including the dotted fracture perforations is extended from the both ends of the centerline outward beyond the meeting points.

6. The air bag door according to claim 5, wherein the superficial material breaking fracture line is extended outward from the both ends of the centerline beyond the meeting points linearly with a bent to a preferred direction so that the direction of deployment is guided in the desired bent angle when the air bag is expanded.

7. A method of deploying an air bag comprising:
controlling an opening angle of the air bag door by door-opening-angle controlling means, and guiding the direction of deployment of the air bag using the opening angle of the air bag door when the air bag stored in a vehicle interior material with a superficial material is expanded upon reception of an impact and breaks and opens the air bag door for being deployed in a vehicle cabin, wherein the direction of deployment of the air bag is guided in a direction at a bent angle of the superficial material breaking fracture line by utilizing the tensile resistance of the superficial material at the time when the air bag door is broken and opened as the door-opening-angle controlling means by employing the air bag door according to the claim 6 as the air bag door.

8. A method of controlling breakage of fracture lines for controlling a substrate and a superficial material to be broken in the order of breakage by portions synchronously with each other when the air bag is deployed comprising:
forming a fracture line for an air bag door including a continuous fracture line of the shape of an air bag door having a pair of doors on a back surface of a substrate of a vehicle interior material with a superficial material and dotted fracture perforations formed at a distance from each other so as to penetrate through the substrate from the bottom portion of the fracture groove and reach the superficial material;
adjusting the depth of the fracture groove of respective portions of the fracture line so that the remaining thickness of a groove portion of a central portion of a centerline of the air bag is set to be smaller than side portions of the centerline; and
selectively forming the dotted fracture perforations at a specific portion of the fracture line.

9. The method of controlling breakage of fracture lines according to claim 8, wherein adjusting the depth of the fracture groove is setting the remaining thickness of the substrate at the groove portion of the centerline of the air bag door to be smaller than other portions, and selectively forming the dotted fracture perforations is forming the dotted fracture perforations at the groove portion of the centerline and at groove portions near meeting points where a pair of sidelines meet the centerline of the air bag door.

10. The method of controlling breakage of fracture lines according to claim 8, wherein in the fracture lines, elongated fracture perforations which penetrate through the substrate from the bottom portion of the fracture groove but do not reach the superficial material are formed at a distance from each other, and the dotted fracture perforations are formed in the bottom portions of the elongated fracture perforations and in the portion where the elongated fracture perforations are not formed at a distance from each other.

11. The method of controlling breakage of fracture lines according to claim 8, wherein a superficial material breaking fracture line including the dotted fracture perforations is extended outward from the both ends of the centerline beyond the meeting points linearly or at a bent angle.

12. The method of controlling breakage of fracture lines according to claim 8, wherein the order of breakage by portions of the substrate and the superficial material is the order from (1) to (3);
(1) The central portion of the centerline is broken first;
(2) The entire centerline is broken linearly to both ends; and when the superficial material breaking fracture line is provided, the superficial material is simultaneously broken along the superficial material breaking fracture line;
(3) The substrate along the pair of sidelines is broken subsequent to or simultaneously with (2) described above.

* * * * *